United States Patent
Nakajima (10) Patent No.: US 8,023,666 B2
(45) Date of Patent: Sep. 20, 2011

(54) VOICE INPUT SUPPORT PROGRAM, VOICE INPUT SUPPORT DEVICE, AND VOICE INPUT SUPPORT METHOD

(75) Inventor: Kaori Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1270 days.

(21) Appl. No.: 11/699,021

(22) Filed: Jan. 29, 2007

(65) Prior Publication Data
US 2008/0107286 A1    May 8, 2008

(30) Foreign Application Priority Data
Oct. 20, 2006 (JP) .................... 2006-285757

(51) Int. Cl.
*H03G 3/20* (2006.01)
(52) U.S. Cl. .............. 381/110; 381/56; 381/57; 381/58
(58) Field of Classification Search .............. 381/57, 381/110, 58, 56
See application file for complete search history.

(56) References Cited

U.S. PATENT DOCUMENTS
2004/0125962 A1* 7/2004 Christoph .................. 381/59
2005/0125233 A1* 6/2005 Matsubara et al. .......... 704/275

FOREIGN PATENT DOCUMENTS
| JP | 2003-029785 | 1/2003 |
| JP | 2005-122042 | 5/2005 |
| JP | 2005122042 A * | 5/2005 |

* cited by examiner

*Primary Examiner* — Vivian Chin
*Assistant Examiner* — Paul Kim
(74) *Attorney, Agent, or Firm* — Staas & Halsey LLP (57) ABSTRACT

There is provided a voice input support program, voice input support device, and voice input support method for assisting users to input voice properly. A voice input support program executable from a computer, for assisting voice input under a noisy environment by executing: a noise measurement step that obtains a measured noise level value by measuring a noise level; and a notification step that outputs an instruction about at least one of a voice level at which voice should be spoken and speak timing, based on at least one registered voice level reference value and the measured noise level value measured by the noise measurement step.

14 Claims, 6 Drawing Sheets

| REGISTRANT | SPEAKING VOLUME: LOUD | SPEAKING VOLUME: MEDIUM | SPEAKING VOLUME: LOW |
|---|---|---|---|
| A | 70 | 65 | 60 |
| B | 68 | 63 | 58 |

FIG.5

| TIME | 9:50:10 ~10:00:40 | 10:00:40 ~10:05:10 | ... | 10:08:00 ~10:10:00 | 10:10:00 ~10:14:00 |
|---|---|---|---|---|---|
| DRIVE ROUTE | LINK1 | LINK5 | | LINK5 | LINK5 |
| ROAD TYPE | HIGHWAY | TUNNEL | | BRIDGE | ORDINARY WAY |
| STATE | JAMMING | SMOOTH | | SMOOTH | SMOOTH |
| NOISE LEVEL | 68 | 71 | | 72 | 63 |

VOICE INPUT SUPPORT PROGRAM, VOICE INPUT SUPPORT DEVICE, AND VOICE INPUT SUPPORT METHOD

BACKGROUND OF THE INVENTION

1. Field of the Invention

The present invention relates to a voice input support program, voice input support device, and voice input support method that assist inputting of voice under noisy environment.

2. Description of the Related Art

In recent years, voice input support devices are used in various scenes. For example, use of voice input support devices has resulted in practical utilization of a car navigation system that enables handsfree operation during driving.

If a noise level is higher than a predetermined threshold value when users are going to speak, a conventional technique relevant to the invention is, for example, a voice recognition device that does not perform voice recognition (see Patent Document 1: Jpn. Pat. Appln. Laid-Open Publication No. 2003-29785). Another example of relevant technique is a voice recognition device that can change a sound volume and quality in voice synthesis and change an acoustic model in voice recognition (see Patent Document 2: Jpn. Pat. Appln. Laid-Open Publication No. 2005-122042).

However, voice recognition devices often cause recognition errors and irritate users. A major factor causing recognition errors is influence of noise, such as driving noise. Even under equal environments, recognition error rates differ depending on loudness of users' voices. When recognition errors occur, users cannot find out why errors are occurring, recognition errors are repeated, and hence feel much stressed.

According to the technique of the Patent Document 2, users are notified of neither reasons why voice recognition has not been carried out nor how voice recognition can be carried out. Therefore, acceptance of voice recognition can be rejected again so that users feel more stressed. In this technique, a threshold value for noise levels is constant while noise levels that disable voice recognition differ depending on users.

Since users also cannot know how loud users had better speak, users can speak too loud or softly compared with a suitable sound volume. Even if an instruction such as "loud voice", "normal voice", or "low voice" is given to users, users individually speak at different levels of volumes.

SUMMARY OF THE INVENTION

The present invention has been made to address problems as described above and is directed to providing of a computer-readable medium storing a voice input support program, voice input support device, and voice input support method that help users input voice properly.

According to one aspect of the invention to address the above problems, there is provided the computer-readable medium storing the voice input support program for assisting voice input under a noisy environment by executing: a noise measurement step that obtains a measured noise level value by measuring a noise level; and a notification step that outputs an instruction about at least one of a voice level at which voice should be spoken and speak timing, based on at least one registered voice level reference value and the measured noise level value measured by the noise measurement step. According to the invention, users can know whether proper voice input is possible or not, depending on noise levels.

Preferably, the computer-readable medium storing the voice input support program according to the one aspect of the invention further causes the computer to execute a registration step that registers the voice level reference value. According to the invention configured in this manner, suitable notification for users' voice levels can be achieved.

Preferably, in the computer-readable medium storing the voice input support program according to the one aspect of the invention, the registration step outputs the instruction about the voice level to a user, measures a voice level of voice inputted from the user in accordance with the instruction, and obtains and registers the voice level reference value, associated with the instruction about the voice level. According to the invention configured in this manner, the voice input support program is capable of expressing noise and voice levels by using a voice level reference value. Therefore, users can grasp noise and voice levels notified by the voice input support program, based on the voice level reference value.

Preferably, the computer-readable medium storing the voice input support program according to the one aspect of the invention further causes the computer to execute a noise level prediction step that obtains route information concerning a drive route of a vehicle equipped with the computer, and calculates a predicted noise level value by predicting a noise level on the drive route on the basis of the route information, wherein the notification step performs notification to a user, based on the predicted noise level value in place of the measured noise level value. According to the invention configured in this manner, users can know a future noise level and can effectively determine timing to speak, depending on the future noise level.

In the computer-readable medium storing the voice input support program according to the one aspect of the invention, the notification step further notifies either the measured noise level value or the predicted noise level value. According to the invention configured in this manner, users can know a noise level at present time and a future noise level, and can effectively determine timing to speak, depending on the noise level at present time and future noise level.

The invention should be considered as including application of any constitutional elements of the invention and arbitrary combinations thereof to a method, device, system, recording medium, and a data structure.

According to the present invention, it is possible to reduce the voice input errors.

DETAILED DESCRIPTION OF THE PREFERRED EMBODIMENTS

Hereinafter, an embodiment of the present invention will be described with reference to the drawings.

The embodiment of the invention will be described with reference to a car navigation system in which a voice input support device according to the invention is applied to a voice recognition function.

A configuration of a car navigation system according to the embodiment of the present invention will be described.

Figure 1:
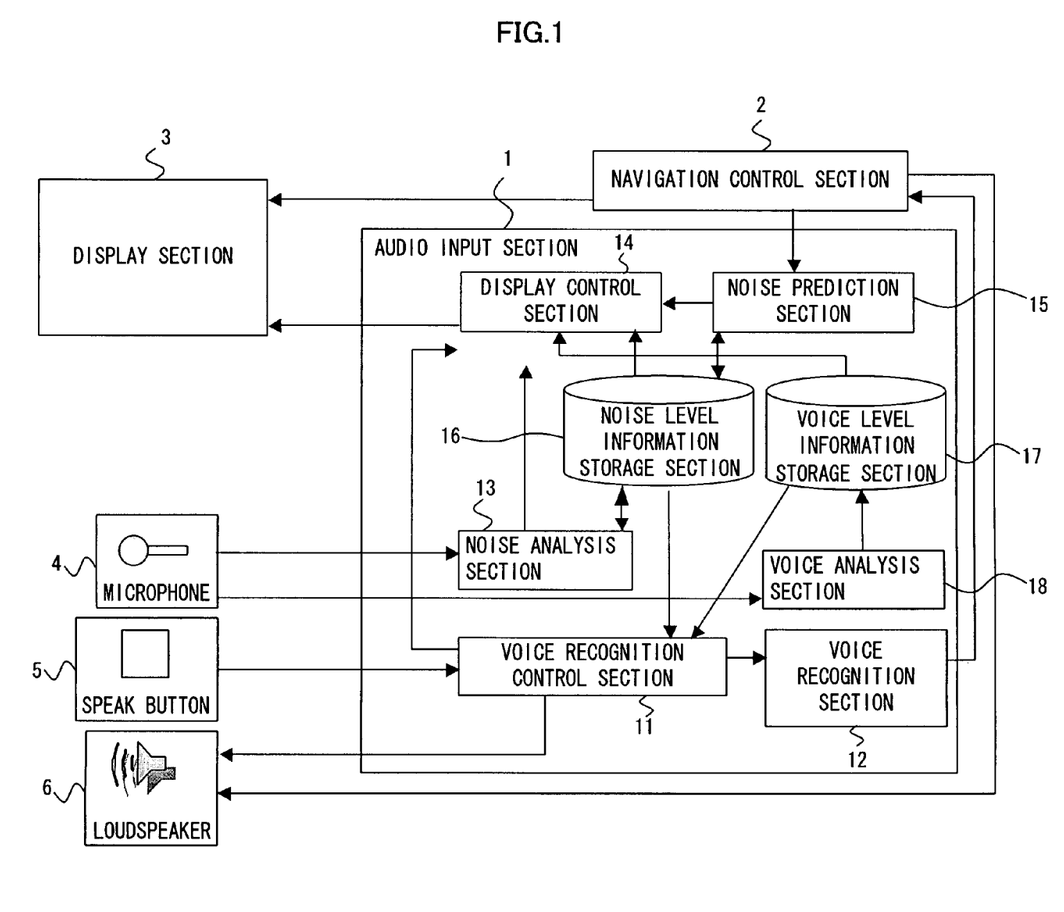
FIG. 1 is a block diagram showing an example of configuration of a car navigation system according to an embodiment.

FIG. 1 is a block diagram showing an example of configuration of a car navigation system according to the embodiment of the invention. The car navigation system has a voice input section 1, a navigation control section 2, a display section 3, a microphone 4, a speak button 5, and a loudspeaker 6. The voice input section 1 includes a voice recognition control section 11, a voice recognition section 12, a noise analysis section 13, a display control section 14, a noise prediction section 15, a noise level information storage section 16, a voice level information storage section 17, and a voice analysis section 18.

The voice input section 1 performs voice recognition of voice input from the microphone 4 at timing when the speak button 5 is pressed. Based on a result of the voice recognition, the voice input section 1 issues a instruction to the navigation control section 2. The navigation control section 2 controls route search, route guidance, and the like in accordance with instructions from the voice input section 1 and other user interfaces. The navigation control section 2 also maintains results of route search as route information. The display section 3 performs display in accordance with instructions from the navigation control section 2 or the voice input section 1. The loudspeaker 6 outputs, as voices, route guidance from the navigation control section 2 and instructions from the voice input section 1.

The voice recognition control section 11 controls voice recognition processing carried out by the voice recognition section 12. The voice recognition section 12 performs voice recognition of voice input from the microphone 4, and issues instructions to the navigation control section 2, based on a result of the voice recognition. The noise analysis section 13 measures noise levels from results of collecting sounds via the microphone 4, and stores measured noise level values as noise level information in the noise level information storage section 16. The display control section 14 controls the display section 3. The noise prediction section 15 predicts noise levels based on route information supplied from the navigation control section 2, and stores predicted noise level values as noise level information in the noise level information storage section 16. The voice analysis section 18 measures voice levels from results of collecting sounds via the microphone 4, and stores measured results as personal voice level information into the voice level information storage section 17.

Operation of the voice input section 1 according to the present embodiment will be described next.

Figure 2:
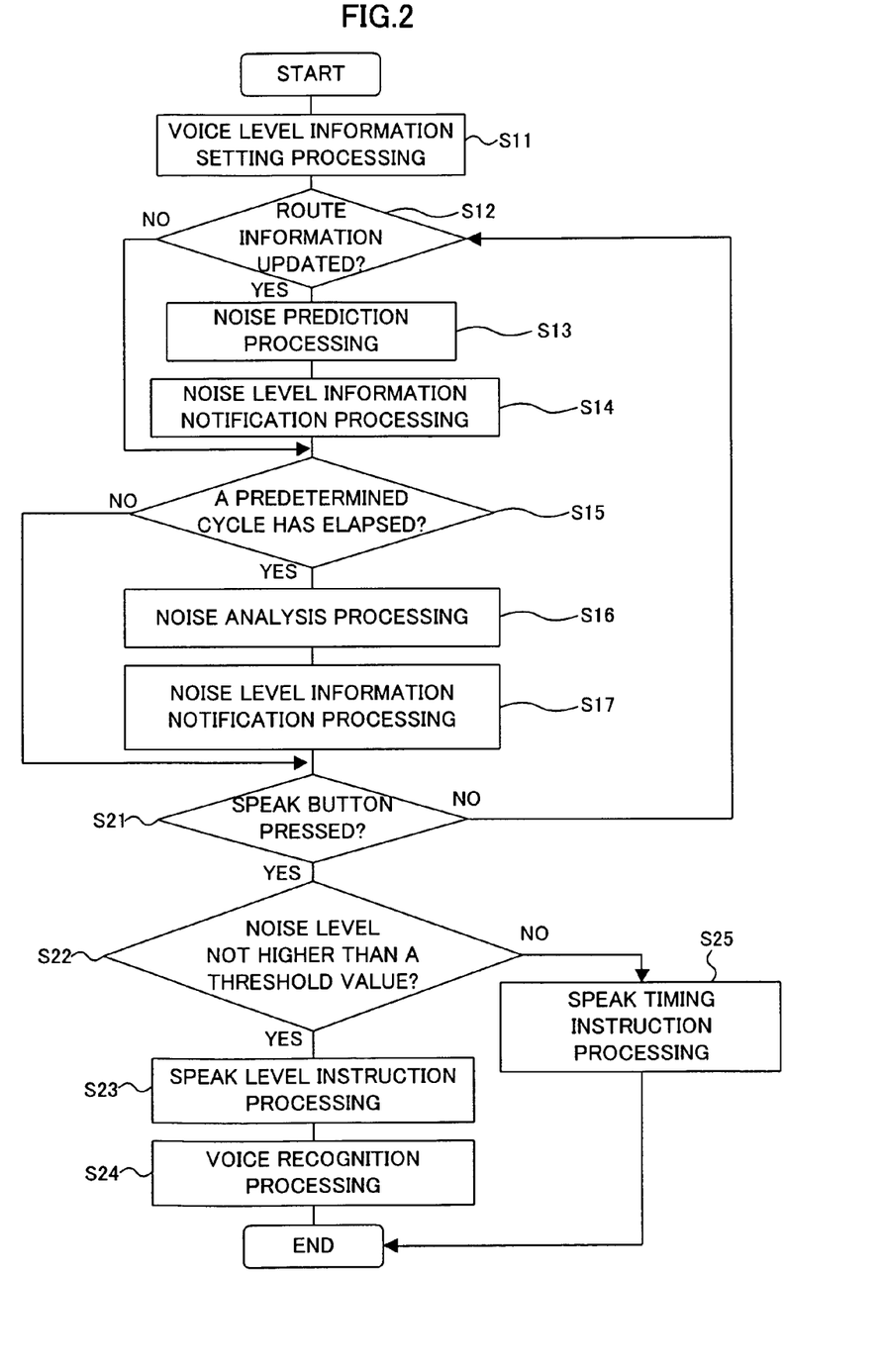
FIG. 2 is a flowchart showing an example of operation of a voice input section according to the embodiment.

FIG. 2 is a flowchart showing an example of operation of the voice input section according to the embodiment. At first, the voice recognition control section 11 performs voice level information setting processing for setting voice level information to use (S11).

Next, the noise prediction section 15 determines whether route information has been updated by the navigation control section 2 or not. If not updated (S12, NO), the processing flow goes to a processing step S15. Otherwise, if updated (S12, YES), the processing flow goes to next processing. Then, the noise prediction section 15 performs noise prediction processing, based on the route information updated by the navigation control section 2, and updates a predicted noise level in the noise level information (S13). The noise prediction section 15 further performs noise level information notification processing for notifying a user of the updated noise level information (S14).

Next, the noise analysis section 13 determines whether a predetermined cycle has passed from previous noise measurement processing or not. If the predetermined cycle has not yet passed (S15, NO), the processing flow goes to a processing step S21. Otherwise, if the cycle has passed (S15, YES), the processing flow goes to next processing. Then, the noise analysis section 13 performs noise measurement processing, based on a result of collecting sounds via the microphone 4, and updates a noise level at present time in the noise level information (S16). Further, the noise analysis section 13 performs noise level information notification processing for notifying the user of the updated noise level information (S17).

Next, the voice recognition control section 11 determines whether the speak button 5 has been pressed or not. If the button has not been pressed (S21, NO), the processing flow returns to the processing step S12. Otherwise, if pressed (S21, YES), the processing flow goes to next processing. Next, the voice recognition control section 11 determines whether the present-time noise level in the noise level information storage section 16 is equal to or lower than a threshold noise level or not (S22). If the present-time noise level is equal to or lower than the threshold noise level (S22, YES), the voice recognition control section 11 performs voice level instruction processing (S23), the voice recognition section 12 performs voice recognition processing (S24), and this processing flow ends. Otherwise, if the threshold noise level is exceeded (S22, NO), the voice recognition control section 11 performs speak timing instruction processing (S25), and this processing flow ends.

Voice level information setting processing will be described next.

Figure 3:
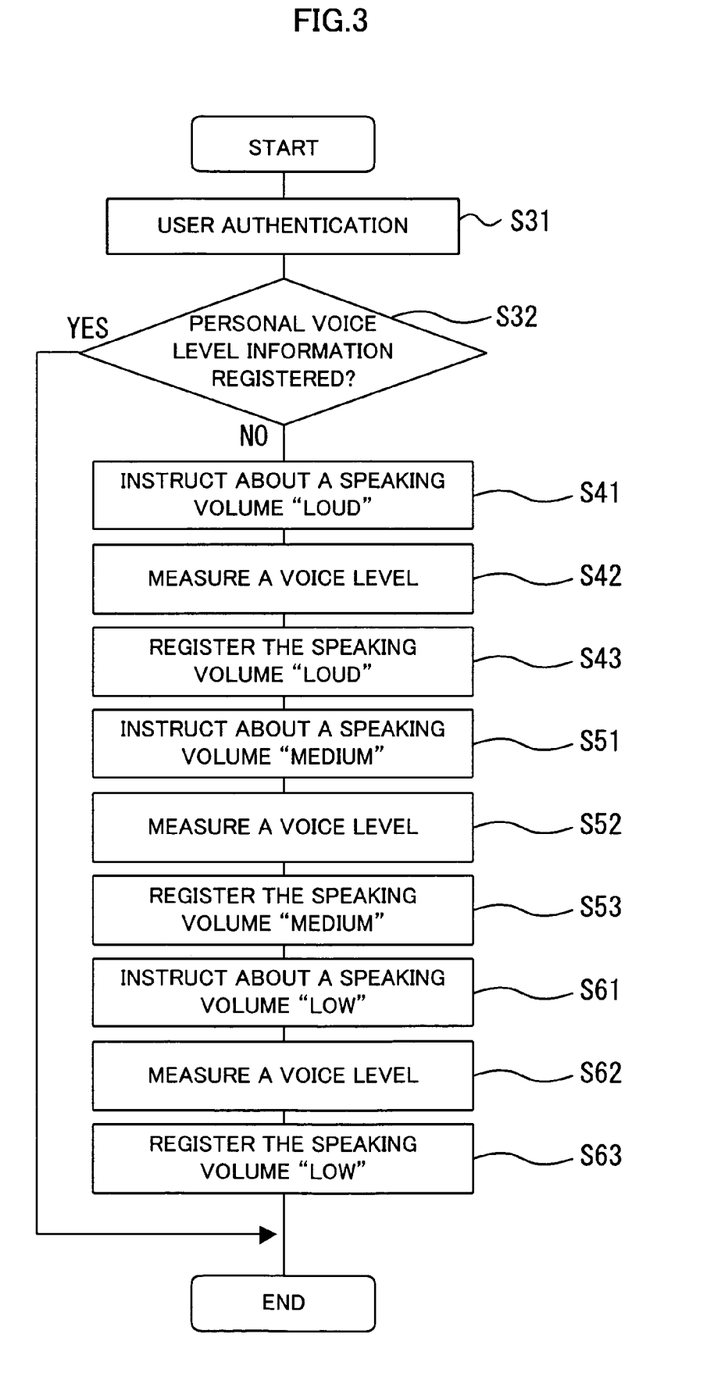
FIG. 3 is a flowchart showing an example of operation of voice level information setting processing according to the embodiment.

FIG. 3 is a flowchart showing an example of operation of the voice level information setting processing according to this embodiment. At first, the voice recognition control section 11 performs authentication of a user who uses the car navigation system (S31). The voice recognition control section 11 determines whether personal voice level information indicative of a voice level peculiar to the user has been registered in the voice level information storage section 17 or not (S32). If the personal voice level information has been registered (S32, YES), the voice recognition control section 11 obtains and sets the personal voice level information as voice level information. This processing flow then ends. Otherwise, if not registered (S32, NO), personal voice level information registration processing (S41 to S63) is carried out to obtain personal voice level information, which is set as voice level information. This processing flow then ends.

Next, the personal voice level information registration processing will be described below.

Description will be made of a case of registering three voice levels which a user feels "loud", "medium", and "low". At first, the voice recognition control section 11 performs control to output an instruction for urging the user to speak in loud voice through the loudspeaker 6 (S41). This instruction is, for example, "please speak loudly". The voice analysis section 18 then obtains, via the microphone 4, voice spoken in accordance with the instruction, and measures a voice level of the voice (S42). The voice analysis section 18 next registers a result of measuring the voice level as a voice level (voice level a) for a speaking volume "loud" in personal voice level information of the user (S43).

Similarly, the voice recognition control section 11 performs control to output an instruction for urging the user to speak in normal voice through the loudspeaker 6 (S51). This instruction is, for example, "please speak in normal voice". The voice analysis section 18 then obtains, via the microphone 4, voice spoken in accordance with the instruction, and measures a voice level of the voice (S52). The voice analysis section 18 next registers a result of measuring the voice level as a voice level (voice level b) for a speaking volume "medium" in personal voice level information of the user (S53).

Also similarly, the voice recognition control section 11 performs control to output an instruction for urging the user to speak in low voice through the loudspeaker 6 (S61). This instruction is, for example, "please speak in low voice". The voice analysis section 18 then obtains, via the microphone 4, voice spoken in accordance with the instruction, and measures a voice level of the voice (S62). The voice analysis section 18 next registers a result of measuring the voice level as a voice level (voice level c) for a speaking volume "low" in personal voice level information of the user (S63).

Described next will be personal voice level information stored into the voice level information storage section 17 through processing shown in FIG. 3.

Figure 4:
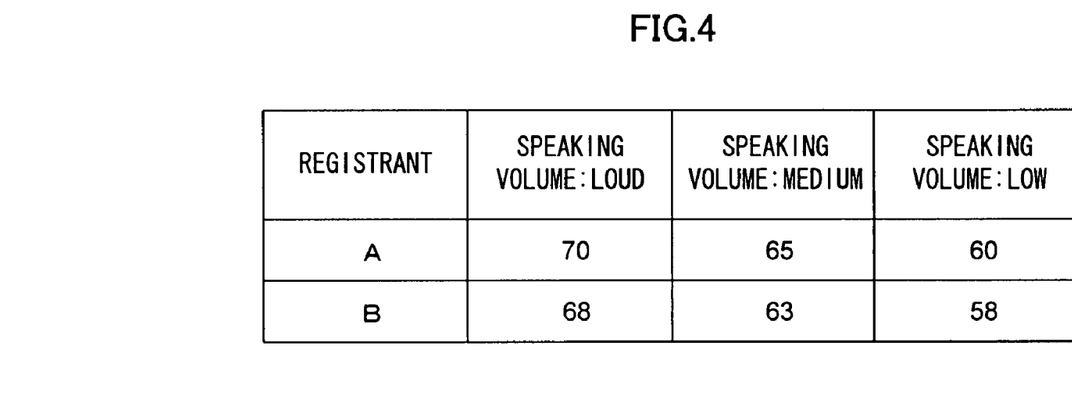
FIG. 4 is a table showing an example of personal voice level information according to the embodiment.

FIG. 4 is a table showing an example of personal voice level information according to the embodiment. This personal voice level information registers personal voice level information for users A and B. As the personal voice level information for each of the users, voice levels (in units of dB) are stored corresponding to voice levels a, b, and c. The voice level a is an upper limit of voice level for a related user. To simplify description of the embodiment, the voice recognition control section 11 is assumed to determine voice recognition to be possible if the voice level is equal to or higher than a noise level. Hence, the voice level a is a threshold noise level.

According to the voice level information setting processing, voice levels of actually spoken voice in response to instructions on loud, medium, and low voice can be set for each user.

Noise prediction processing will be described next.

At first, the noise prediction section 15 obtains route information from the navigation control section 2. A route is divided into several segments from a start place to a destination place. Route information contains time, a drive route, a road type, and a state for each of the segments. The time indicates a time point when the user is predicted to drive through a related segment. The drive route indicates a link number of a related segment. The road type indicates a type of the road (e.g., a highway, tunnel, bridge, or ordinary way) in a related segment. The state indicates a state of a traffic jam (e.g., jamming, clouded, or smooth) in a related segment. The noise level information storage section 16 stores, in advance as reference noise level information, noise levels measured in correspondence with parameters concerning the road types and states for each segment. Next, the noise prediction section 15 refers to the reference noise level information corresponding to parameters concerning the road type and state for each segment, and predicts a noise level for a related segment. The noise prediction section 15 further stores the predicted noise level as noise level information into the noise level information storage section 16.

Figure 5:
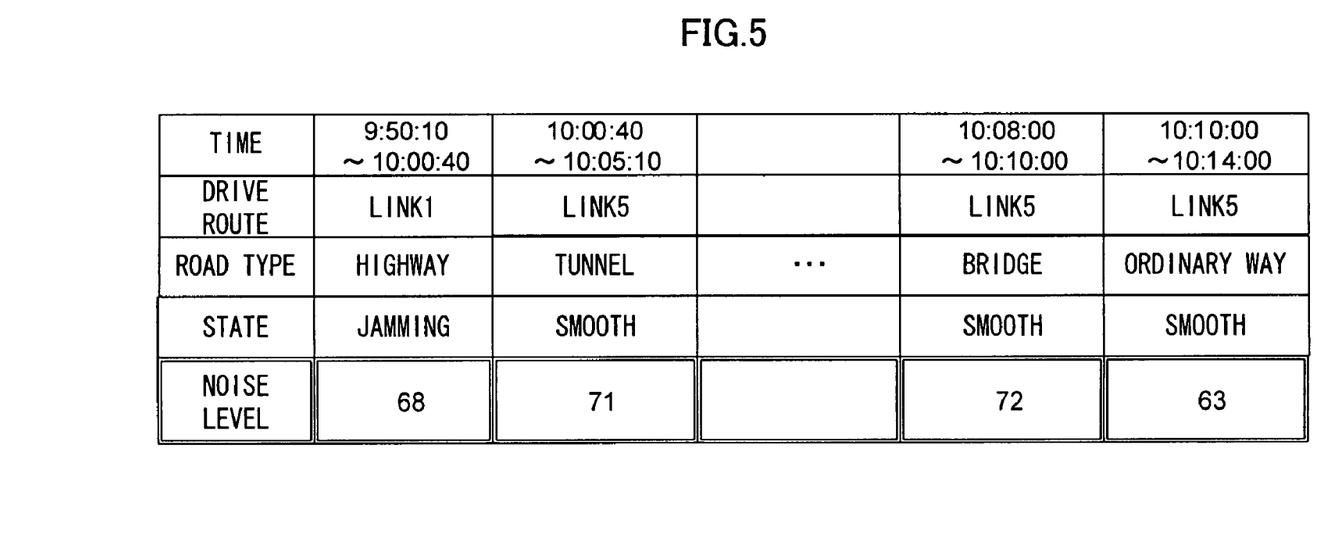
FIG. 5 is a table showing an example of noise level information according to the embodiment.

FIG. 5 is a table showing an example of noise level information stored in the noise level information storage section 16 according to the embodiment. The noise level information includes time, a drive route, a road type, a state, and further a noise level (dB) for each segment, which are obtained from route information.

According to the noise prediction processing described above, noise on the route can be predicted from prestored noise levels corresponding to states of roads.

Noise measurement processing will be described next.

The noise analysis section 13 measures a noise level from a result of collecting sounds via the microphone 4, and updates a noise level in noise level information for a segment which the user is driving at present with the measured noise level. In other words, the noise level in the noise level information for a segment which the user is driving at present is an actually measured value. Noise levels for other segments to drive later are predicted values.

According to the noise measurement processing described above, accuracy of the noise level at present in the noise level information can be improved.

Next, noise level notification information will be described.

Figure 6:
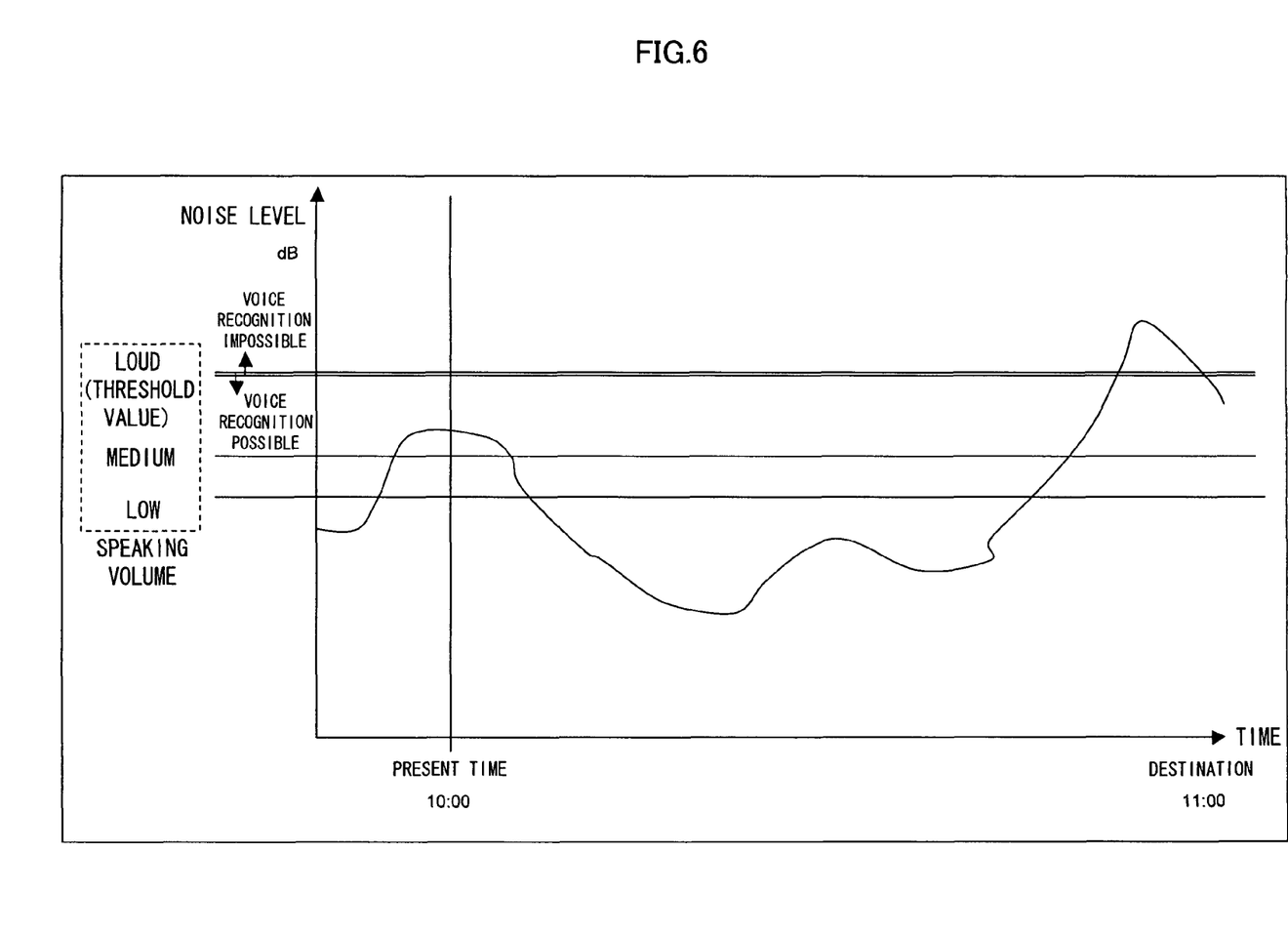
FIG. 6 shows a screen of a first example, displayed through noise level notification processing according to the embodiment.

The display control section 14 controls the display section 3 to show as a graph noise level information updated by the noise prediction processing or noise measurement processing. FIG. 6 shows a screen depicting a first example of display on the display section 3, using noise level notification processing according to this embodiment. This example shows a case of the user A in FIG. 4. The horizontal axis of this graph expresses time and the ordinate expresses a noise level (dB). The graph shows a voice level a (speaking volume "loud"), a voice level b (speaking volume "medium"), and a voice level c (speaking volume "low") in personal voice level information of the user. As described previously, the voice level a is a threshold noise level. When a noise level exceeds the threshold noise level, the graph shows that proper voice recognition is impossible. When a noise level is not higher than the threshold noise level, the graph shows that proper voice recognition is possible. That is, the loudest voice which the user A can speak out is at the voice level a, i.e., the user A is regarded as being unable to speak louder than the voice level a. Accordingly, a determination of being unable to recognize voice of the user A is made when a noise level is higher than the voice level a. The graph also shows present time.

Figure 7:
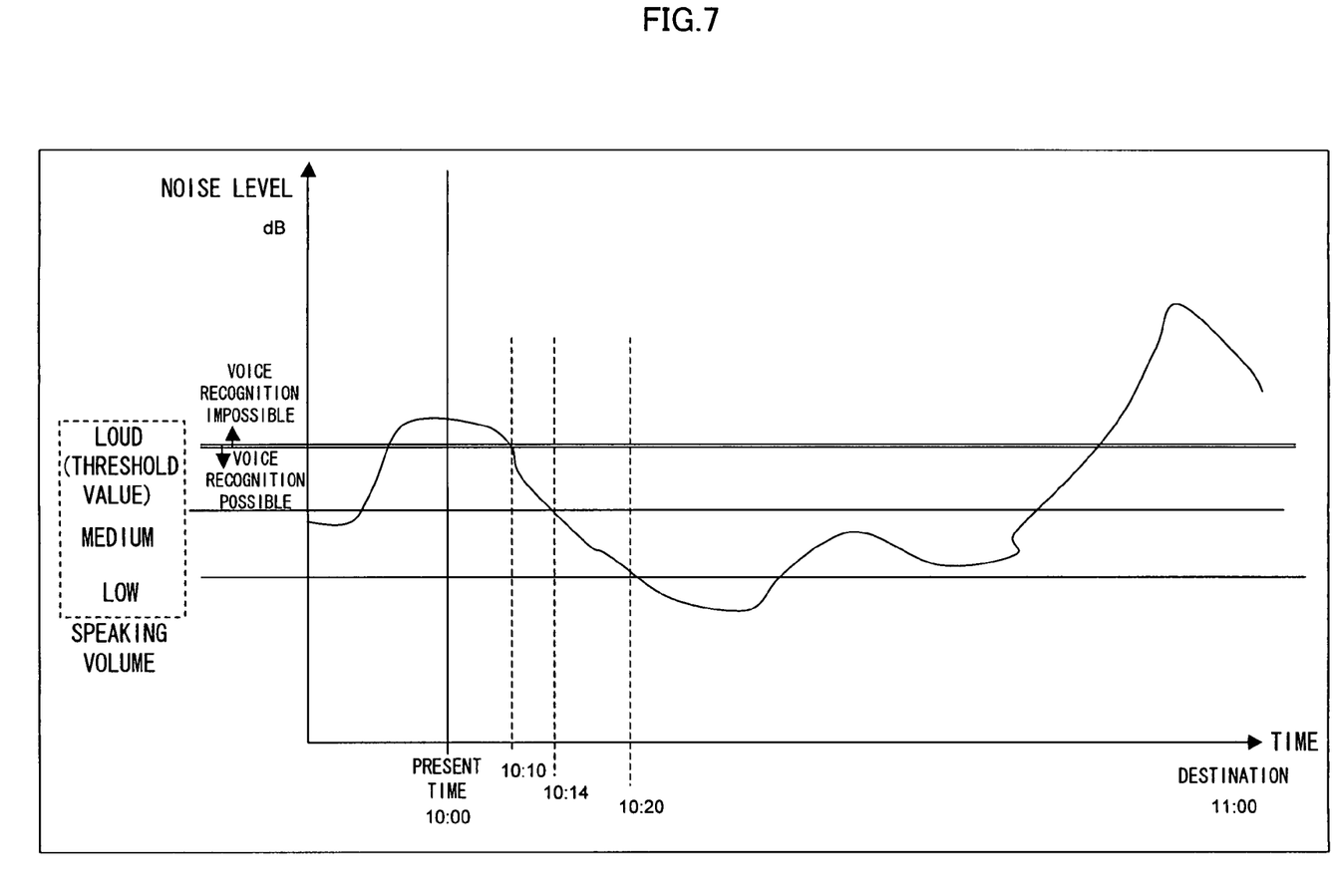
FIG. 7 shows a screen of a second example, displayed through noise level notification processing according to the embodiment.

FIG. 7 shows a second example of a screen displayed on the display section 3 by the noise level notification processing according to this embodiment. This example shows a case of the user B in FIG. 4. The graph obeys the same notation system as in the case of the user A. As can be seen in FIG. 4, voice levels of the user B are lower than those of the user A. As the graph outputs, the noise level (actually measured) at 10:00 (present time) exceeds the voice level a of the user B. The noise level decreases below the voice level a after 10:10. After 10:14, the noise level (predicted) decreases below the voice level b. After 10:20, the noise level (predicted) further decreases below the voice level c.

According to the noise level notification processing, the user can compare a present or future noise level with the user's own voice levels. Accordingly, the user can know what time band will enable voice recognition, how high voice level should be when the user speaks if voice recognition is possible, etc.

Described next will be voice level instruction processing.

At first, the voice recognition control section 11 compares a present time noise level according to noise level information with each of three voice levels (voice levels a, b, and c) according to voice level information. The lowest voice level is selected among those of the three voice levels that are equal to or higher than the present time noise level. The selected voice level is set as an instructional voice level. Next, the voice recognition control section 11 performs control to output an instruction corresponding to the instructional voice level through the loudspeaker 6. For example, if the instructional voice level is the voice level a, the voice recognition control section 11 generates a sound "peep, peep, peep" through the loudspeaker 6. Peep sounds "peep, peep" and "peep" are generated through the loudspeaker 6 respectively for the voice levels b and c.

Alternatively, the voice recognition control section 11 outputs a message "Please speak loudly" through the loudspeaker 6 if the instructional voice level is the voice level a. A message "Please speak in medium voice" is outputted through the loudspeaker 6 if the instructional voice level is the voice level b, as well as a message "Please speak in low voice" if the instructional voice level is the voice level c. Applied to these messages are terms or expressions corresponding to instructional messages used in personal voice level information registration processing.

Assume that the user A presses the speak button 5 at 10:00 (present time). The present time noise level is higher than the voice level b and lower than the noise level a. Therefore, the instructional voice level is the voice level a. The voice recognition control section 11 outputs an instruction "peep, peep, peep" or "Please speak loudly" through the loudspeaker 6.

The voice recognition control section 11 can not only output instructions corresponding to instructional voice levels through the loudspeaker 6 but also show these instructions on the display section 3.

According to the voice level instruction processing described above, the user can know a suitable voice level when performing voice recognition. If the noise level is high, the user can intentionally speak at a high voice level. Further, the user can less frequently face a situation that the user speaks unnecessarily loudly or lowly. Accordingly, voice recognition can improve.

Speak timing instruction processing will be described next.

The voice recognition control section 11 is capable of outputting an alarm sound or message "The noise level is high now and cannot recognize your voice" through the loudspeaker 6. The voice recognition control section 11 can output the alarm message not only through the loudspeaker 6 but also display section 3.

The voice recognition control section 11 searches for a proximate time point when the predicted noise level goes down below the threshold noise level, referring to noise level information. The voice recognition control section 11 sets the proximate time point as speak timing. Next, the voice recognition control section 11 outputs a message indicative of the speak timing through the loudspeaker 6. The voice recognition control section 11 can output the message indicative of the speak timing not only through the loudspeaker 6 but also through the display section 3.

Assuming that the user B presses the speak button 5 at 10:00 (present time) in the example shown in FIG. 7, the present time noise level is higher than the threshold noise level (voice level a). Therefore, the voice recognition control section 11 outputs an alarm sound or message through the loudspeaker 6.

Next, the voice recognition control section 11 searches for noise level information. Since the predicted noise level goes below the threshold noise level (voice level a) after 10:10, a message "Loud voice can be recognized from 10:10" is outputted through the loudspeaker 6. Further, the predicted noise level goes down below the voice level b after 10:14. Therefore, the voice recognition control section 11 can output a message "Medium voice can be recognized from 10:14" through the loudspeaker 6. Further, the predicted noise level goes down below the voice level c from 10:20. Therefore, the voice recognition control section 11 can output a message "Low voice can be recognized from 10:20" through the loudspeaker 6. The voice recognition control section 11 can output, through the loudspeaker 6, a message "Loud voice can be recognized from 10:10 after passing a bridge" which is combined with information concerning road types and the like in noise level information shown in FIG. 5.

According to the speak timing instruction processing described above, the user can know that voice recognition is impossible even when the noise level is so high that voice recognition is impossible. In addition, the user can know speak timing when voice recognition becomes available. If the noise level exceeds the threshold noise level when the user is going to speak, a presentation is given to inform the user of unacceptable voice recognition and timing to speak. Therefore, the user can speak at presented timing, and recognition errors can be reduced.

According to the voice level instruction processing and speak timing processing described above, recognition errors decrease so that stress on users can be reduced. By registering voice levels for each of users, optimal messages can be given depending on the user's voice levels.

This embodiment describes that the voice recognition control section 11 determines voice recognition to be possible when the voice level is equal to or higher than the noise level. However, in personal voice level recognition processing, ratio of voice levels to noise levels when voice recognition is determined to be possible can be calculated on the basis of margins based on performance of the voice recognition section with respect to measured voice levels or on the basis of voice quality (spectrums) of each user. These ratios can be stored as margins. When comparing noise level information with voice level information, a determination can be made adding these margins. That is, the voice recognition control section 11 determines voice recognition to be possible if a ratio of a voice level to a noise level is equal to or higher than a margin.

Also, this embodiment has been described with reference to a case that the invention is applied to voice recognition in a car navigation system. However, the invention can further be applied to a voice input device under noisy environment, such as a handsfree conversation function for cellular phones to be used in cars.

Note that a noise measurement step in claims corresponds to the noise analysis processing in the embodiment. A notification step in claims corresponds to the noise level information notification processing, voice level instruction processing, and speak timing instruction processing in this embodiment. A registration step in claims corresponds to the personal voice level information registration processing in the embodiment. A noise prediction step in claims corresponds to the noise prediction processing in the embodiment. An acoustic recognition step in claims corresponds to the voice recognition processing in the embodiment. A noise measurement section corresponds to the noise analysis section in the embodiment. A notification section in claims corresponds to the voice recognition control section in the embodiment. A registration section in claims corresponds to the voice analysis section in the embodiment.

The voice input support device according to the embodiment can be easily applied to an information processing device using voice input and can improve performance of the information processing device. The information processing device can include, for example, a car navigation system, a PC (Personal Computer), and the like.

Further, a program which causes a computer constituting a voice input support device to execute the steps described above can be provided as a voice input support program. If the program is stored in a storage medium readable from a computer, the program can be executed by the computer constituting the voice input support device. The storage medium readable from the computer is, for example, an internal storage device such as a RAM or ROM built in a computer, a portable storage medium such as a CD-ROM, flexible disc, DVD disc, magneto-optical disc, or IC card, a database containing a computer program, another computer and a database thereof, or an online transfer medium.

What is claimed is:

1. A non-transitory computer-readable medium storing a program causing a computer to execute a process for assisting voice input under a noisy environment the process comprising:
    obtaining a measured noise level value by measuring a noise level;
    obtaining route information concerning a drive route of a vehicle equipped with the computer;
    calculating a predicted noise level value by predicting a noise level on the drive route based on the route information; and
    outputting an instruction about at least one of a voice level at which voice should be spoken and speak timing, based on at least one registered voice level reference value and the measured noise level value, wherein
        the outputting determines a threshold noise level value as a threshold value under which proper voice input is possible, based on the at least one registered voice level reference value, and
        if the measured noise level value exceeds the threshold noise level value, the outputting predicts and notifies the speak timing when proper voice input is possible, based on the predicted noise level value.

2. The non-transitory computer-readable medium according to claim 1, the process further comprising registering the voice level reference value.

3. The non-transitory computer-readable medium according to claim 2, wherein
    registering outputs the instruction about the voice level to a user, measures a level of voice inputted from the user in accordance with the instruction, and registers the voice level reference value, associated with the instruction about the voice level.

4. The non-transitory computer-readable medium according to claim 2, wherein the registering authenticates users, and registers the voice level reference value for each of the users.

5. The non-transitory computer-readable medium according to claim 1, wherein the route information includes at least one of a road type of the drive route and jam information concerning the drive route.

6. The non-transitory computer-readable medium according to claim 1, wherein the calculating calculates the predicted noise level value, using a noise level that is measured in advance, associated the route information.

7. The non-transitory computer-readable medium according to claim 1, wherein the calculating calculates newly a predicted noise level value if the route information is changed.

8. The non-transitory computer-readable medium according to claim 1, wherein the calculating notifies either the measured noise level value or the predicted noise level value.

9. The non-transitory computer-readable medium according to claim 1, wherein if the measured noise level value exceeds the threshold noise level value, the outputting selects and notifies a voice level at which proper voice input is possible, among the at least one registered voice level reference value.

10. The non-transitory computer-readable medium according to claim 1, wherein if the measured noise level value is equal to or lower than the threshold noise level value, the outputting determines and notifies a noise level at which proper voice input is possible, based on the measured noise level value and the at least one registered voice level reference value.

11. The non-transitory computer-readable medium according to claim 1, wherein if a ratio of a particular voice level reference value to the measured noise level value is equal to or higher than a predetermined margin, the outputting determines that proper voice input is possible depending on the particular voice level reference value.

12. The non-transitory computer-readable medium according to claim 1, the process comprising performing voice recognition by use of voice inputted if the measured noise level value is equal to or lower than the threshold noise level value.

13. A voice input support device for assisting voice input under a noisy environment, comprising:
    a noise measurement section that obtains a measured noise level value by measuring a noise level;
    a noise level prediction section that obtains route information concerning a drive route of a vehicle equipped with the voice input support device, and calculates a predicted noise level value by predicting a noise level on the drive route based on the route information; and
    a notification section that outputs an instruction about at least one of a voice level at which voice should be spoken and speak timing, based on at least one registered voice level reference value and the measured noise level value, wherein
    the notification section determines a threshold noise level value as a threshold value under which proper voice input is possible, based on the at least one registered voice level reference value, and
    if the measured noise level value exceeds the threshold noise level value, the notification section predicts and notifies the speak timing when proper voice input is possible, based on the predicted noise level value.

14. A voice input support method executable from a computer, for assisting voice input under a noisy environment the method comprising:
    obtaining a measured noise level value by measuring a noise level;
    obtaining route information concerning a drive route of a vehicle equipped with the computer;
    calculating a predicted noise level value by predicting a noise level on the drive route based on the route information; and
    outputting an instruction about at least one of a voice level at which voice should be spoken and speak timing, based on at least one registered voice level reference value and the measured noise level value, wherein
        the outputting determines a threshold noise level value as a threshold value under which proper voice input is possible, based on the at least one registered voice level reference value, and
        if the measured noise level value exceeds the threshold noise level value, the outputting predicts and notifies the speak timing when proper voice input is possible, based on the predicted noise level value.

* * * * *